US006769816B2

(12) United States Patent
Capewell et al.

(10) Patent No.: US 6,769,816 B2
(45) Date of Patent: Aug. 3, 2004

(54) MULTI-WAVELENGTH TRANSCEIVER DEVICE WITH INTEGRATION ON TRANSISTOR-OUTLINE CANS

(75) Inventors: Dale L. Capewell, Agoura Hills, CA (US); Sam Beizai, Sherman Oaks, CA (US); Siva Yegnanarayanan, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 87 days.

(21) Appl. No.: 10/229,644

(22) Filed: Aug. 28, 2002

(65) Prior Publication Data

US 2004/0042736 A1 Mar. 4, 2004

(51) Int. Cl.[7] .............................................. G02B 6/255
(52) U.S. Cl. .............................. 385/89; 385/24; 385/93
(58) Field of Search ........................ 385/14, 24, 88–94

(56) References Cited

U.S. PATENT DOCUMENTS 5,894,535 A * 4/1999 Lemoff et al. ............. 385/14 X

OTHER PUBLICATIONS

Intor, Inc., "Excellence in Optics." www.intor.com/applications.html, Aug. 8, 2002, pp. 1–11.
Chang, Edward S., "10 GbE CWDM 850 nm VCSEL for Installed and New MM Fiber." ieee 802.3ae Ottawa, May 2000, pp1–15.

Aronson, et al., "Low–Cost Multimode WDM for Local Area Networks Up to 10 GB/s." IEEE Photonics Technology Letters, vol. 10, No. 10, Oct. 1998. pp. 1489–1491.

Lemoff, et al., Zigzag waveguide demultiplexer for multimode WDM LAN. Electronics Letters Vol. 34, Bi, 10, May 14, 1998, pp. 1014–1016.

Lemoff, et al., "WWDM Transceiver Module for 10–Gb/s Ethernet." IEEE 802.3 HSSG Interim Meeting, Jun. 1999, pp. 1–32.

Grann, et al., "8 Channel VCSEL Transceiver for 10–Gig." IEEE 802.3 HSSG Interim Meeting, Jan. 2000, pp. 1–18.

Wiedemann, Bill, "Evaluating 10GBASE–SX CWDM." IEEE 802.3ae Meeting, Jul. 2000. pp. 1–20.

Oz Optics, "Fiber Collimators/Focusers," OZ Optics Ltd., Sep. 1999, pp. 1–5.

* cited by examiner

Primary Examiner—Phan T. H. Palmer
(74) Attorney, Agent, or Firm—Pillsbury Winthrop LLP (57) ABSTRACT

An integrated zig-zag transceiver module for multiplexing and demultiplexing several wavelengths achieves a high level of integration by combining several electronic and optical elements into TO headers with lids. A photodetector, a transimpedance amplifier (TIA), a lens, and a thin-film filter are integrated into a single TO can, with the filter and lens being designed for off-axis illumination and focusing. A VCSEL, a lens, and a thin-film filter are integrated into a single TO can, with the filter and lens being designed for off-axis beam steering and collimation.

26 Claims, 8 Drawing Sheets

MULTI-WAVELENGTH TRANSCEIVER DEVICE WITH INTEGRATION ON TRANSISTOR-OUTLINE CANS

BACKGROUND

1. Technical Field

The present invention relates to optical communications, and in particular, to a system and method for providing a multi-wavelength transceiver device with integration on transistor-outline (TO) headers.

2. Related Art

Wavelength Division Multiplexing (WDM) has become the dominant technology for transmitting data at high rates over long spans of optical fiber. A typical WDM system comprises expensive single-mode thermoelectrically stabilized lasers, external-cavity modulators, and single-mode fiber. In this system, light of different wavelengths is typically multiplexed and demultiplexed using expensive arrayed waveguide gratings (AWGs). As the desire for increased bandwidth penetrates the local access and metro markets, it has become imperative to find cost-effective solutions for providing high data rates over multi-mode fiber (MMF) that has distances less than 300 m. Cost is usually the most important metric for comparing different solutions that meet the specifications of a particular optical link. It is well known that a 10 Gbps serial solution using an inexpensive vertical cavity surface-emitting laser (VCSEL) source cannot be used on the existing MMF base because the 160 MHz km modal bandwidth of the fiber limits transmission at this rate to distances less than 32 m. At 1310 nm, where the modal bandwidth of installed MMF is 250 MHz km, the maximum distance is extended to 50 m, still short however of the desired 100 m span.

A current task force investigating 10 GBase Ethernet considers a four-channel WDM, using a course wavelength grid spacing as an important physical medium dependent (PMD) layer option for deployment of this new standard. Systems based on a coarse wavelength spacing near 20 nanometer, in contrast to a 0.8 nanometer spacing for conventional WDM, are insensitive to laser frequency drift with temperature, eliminating the need for thermoelectric controllers. Advances in the fabrication techniques of vertical cavity surface-emitting lasers (VCSELs) at wavelengths near 850 nm present a low-cost alternative to much more expensive distributed feedback (DFB) lasers at 1550 nm, particularly when the course wavelength spacing permit higher production yields. In further contrast to conventional WDM, the use of multimode fiber permits passive optical alignment of optical components, reducing cost even more and enabling first generation 10 Gbase Coarse Wavelength Division Multiplexing (CWDM) systems to be deployed in spans up to 100 m over the existing MMF base. For example, a four-channel CWDM PMD at 850 nm, each channel operating at only 2.5 Gbps, has a transmission distance up to 128 m on installed MMF. This meets the optical link specification of 100 m.

Several different four-channel transceiver designs have been currently proposed. One such transceiver design uses a 4-way optical splitter and thin film filters (TFFs) to demultiplex the signals, and is based on VCSELs at center wavelengths in the 820–865 nm range with 15 nm spacing. Another transceiver design is also based on TFFs and VCSELs in the same wavelength range but utilizes a polymer waveguide in "zig-zag" configuration to reduce loss by 6 dB per channel over the 4-way optical splitter design.

There is also a design that builds upon the polymer waveguide structure and utilizes un-cooled DFB lasers in the 1280–1340 nm range and 20 nm channel spacing. However, none of these transceiver designs utilizes a method to achieve high levels of integration, so as to lower the cost of manufacturing these transceiver devices. As a result, the manufacturing cost remains high. Therefore, an arrangement that is suited to the implementation of a low cost CWDM transceiver is needed.

Other problems also exist in the current conventional transceiver designs. For example, the thin film filter (TFF) designs in the conventional transceiver designs are not optimized for non-normal incidence, which is known to produce a shift in the wavelength in passband and cause s and p polarization dependence. In addition, close proximity of detectors and transimpedance amplifiers associated with different channels exist in these transceiver devices. As a result, these devices are vulnerable to channel "cross-talk." Channel-dependent optical loss in both the transmitter and receiver often leads to unequal signal strengths.

DETAILED DESCRIPTION

Reference will now be made in detail to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, the invention may be practiced without these specific details. In other instances, well-known methods, procedures, and components have not been described in detail as not to unnecessarily obscure aspects of the present invention.

Embodiments of the present invention are directed to addressing the aforementioned drawbacks associated with providing a multi-wavelength transceiver device. Embodiments of the present invention are also directed to providing a multi-wavelength transceiver device using integration on TO cans having TO headers and TO header lids. Embodiments of the present invention are further directed to an integrated zig-zag transceiver assembly for multiplexing and demultiplexing several wavelengths in the context of course wavelength division multiplexing (CWDM). In one implementation, the transceiver module achieves a high level of integration by combining several electronic and optical elements into a standard TO can, with some components being integrated onto the TO header and other components being incorporated into the TO header lid. For example, the complete integration may include the integration and incorporation of a photodetector, a transimpedance amplifier (TIA), a lens, and a TFF into a single TO can. Alternatively, the TFF may also be left out of the TO can in certain applications. In one embodiment, the TFF and lens are designed for off-axis illumination and focusing. In another example, the complete integration may include a VCSEL, a lens, and a TFF into a single TO header, wherein the filter and lens may also be designed for off-axis beam steering and collimation. These arrangements and the utilization of TO cans are suited to the application of a low cost CWDM transceiver as well as other optical telecommunications devices that could use such integration and packaging. The use of TO cans, populated with photodetectors and/or VCSELs, in a CWDM transceiver module not only provides support for integrated optical elements such as lenses and TFFs, but it also allow channel cross talk to be minimized. Additional features that may also be implemented in embodiments of the present invention include a divergence compensating collimator design and a reverse ordering of receiver channels and/or gradient transimpedance gain.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" or "according to one embodiment" appearing in various places throughout the specification are not necessarily all referring to the same embodiment.

Figure 1:
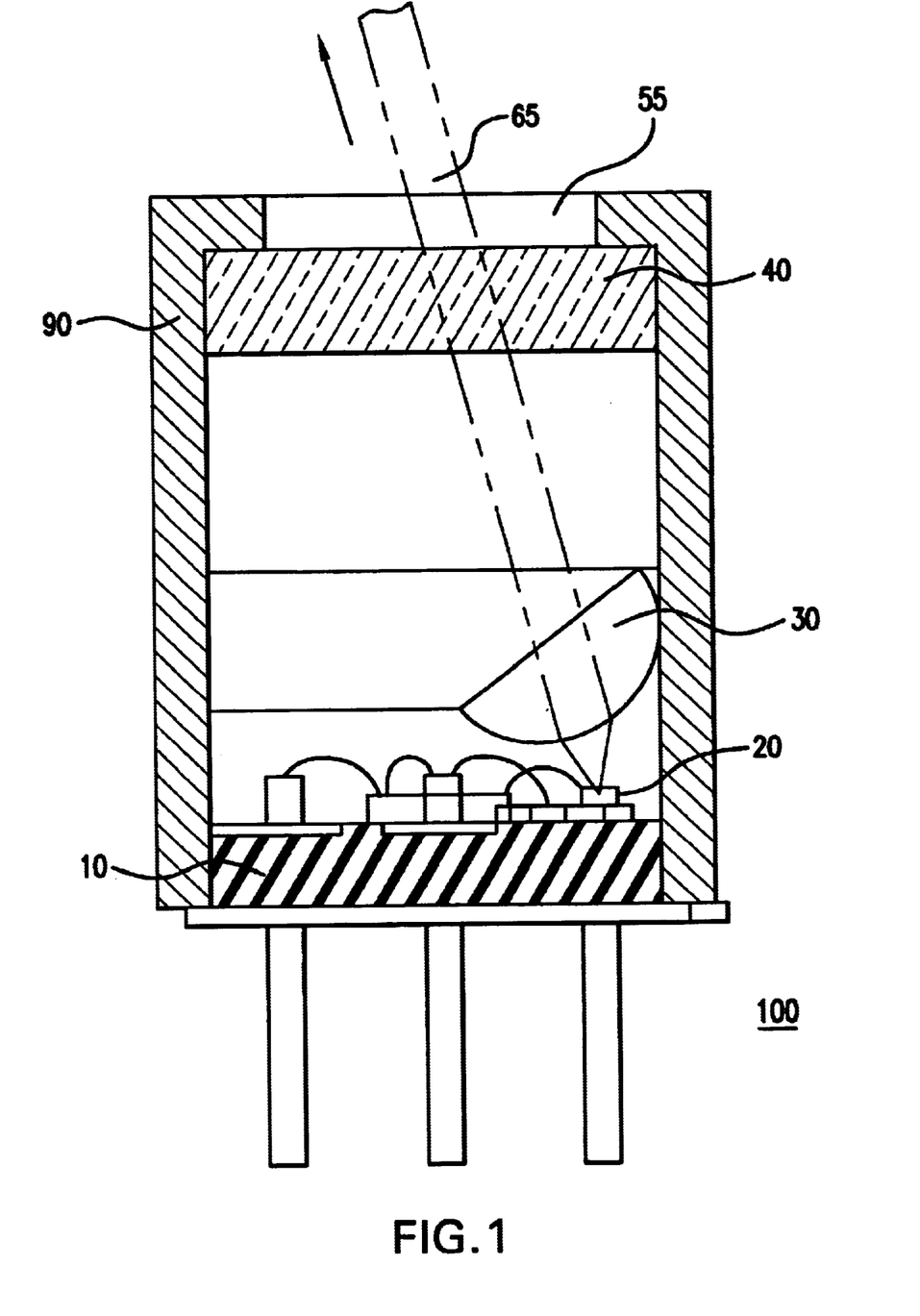
FIG. 1 shows an integration of a VCSEL, lens and thin-film filter into a transistor-outline (TO) can according to an embodiment of the present invention.

FIG. 1 illustrates a cross-sectional view of a TO can with the integration of a VCSEL, lens and thin-film filter according to an embodiment of the present invention. The TO can 100 comprises a TO header 10, a TO header lid 90, a VCSEL 20, a lens 30, and a TFF 40. The VCSEL 20 is integrated onto the TO header 10, and may be replaced by other types of light source, such as an edge-emitting laser. The lens 30 and TFF 40 are incorporated into the TO header lid 90, with the lens 30 being positioned between the VCSEL 20 and the TFF 40. In one embodiment, the VCSEL 20 is mounted off-axis and/or tilted slightly on the TO header 10, and the lens 30 is specifically designed to collimate a divergent beam from the VCSEL 20 and direct the collimated beam 65 off-axis toward the exit aperture 55. The lens 30 may, for example, be an off-axis lens. Thus, when the TO header 10 is fitted with the TO header lid 90, which holds place the lens 30, the power into the off-axis collimated beam 65 is maximized. In addition, the TO header lid 90 may also contain a TFF 40 designed with a passband that ensures high transmittance at the specific VCSEL wavelength and specific angle of incidence. In particular, the TFF 40 is designed to account for the shift in the center bandpass frequency associated with the off-axis illumination. In one embodiment, the TFF 40 may, for example, reside on a glass or a plastic window inside the TO header lid 90 and be positioned near or as close as possible to the exit aperture 55.

Figure 2:
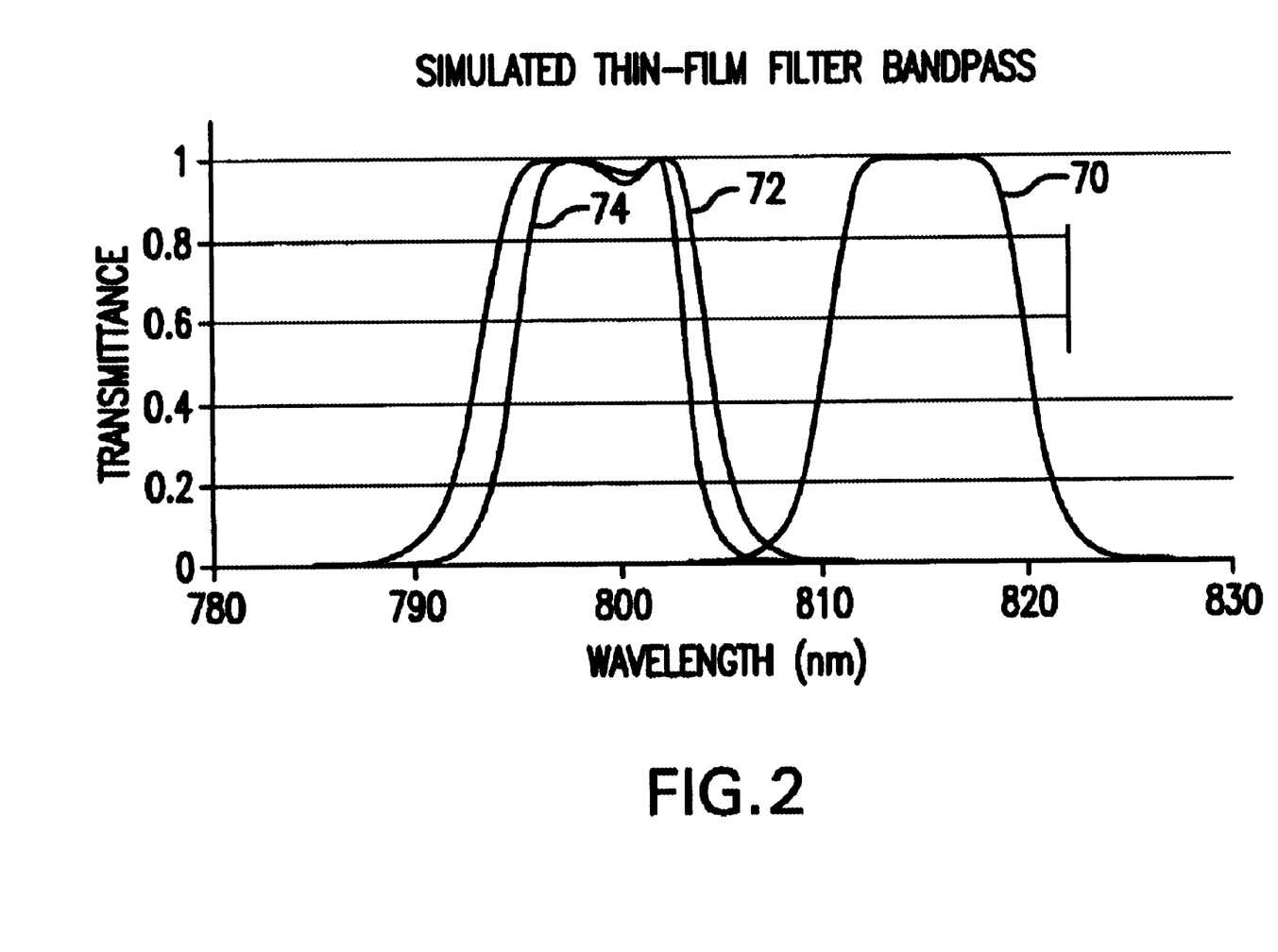
FIG. 2 shows off-axis transmission characteristics of a typical 3-cavity thin-film filter according to an embodiment of the present invention.

Although other methods may be implemented, the design of TFF for non-normal incidence likely requires quantitatively a shift in the passband of thin-film filters' polarization sensitivity of the bandpass characteristics at non-normal incidence. FIG. 2, for example, shows off-axis transmission characteristics of a typical three-cavity TFF with and without a 15 degree angle of incidence. Three passbands are shown in FIG. 2: passbands 70, 72, 74. Passband 70 represents the passband for normal incidence, or with zero degree angle of incidence. Passband 72 represents the passband for 15 degree angle of incidence with p polarization. Passband 74 represents the passband for 15 degree angle of incidence with s polarization. In this particular design, the passband of a three-cavity filter is shifted approximately 15 nm and exhibits s and p polarization dependence. The bandwidths are calculated by assuming that either s and p polarization differs by approximately 4 nm. The preferred TFF design for this application therefore accounts for the shift in the center of the passband, and minimizes the sensitivity to polarization at the selected angle of incidence.

To maximize the power in the collimated beam, the VCSEL 20 may be tilted toward the axis of the TO header 10 by a few degrees. However, in some applications, the tilt in the VCSEL 20 is adjusted to create the appropriate power in the collimated beam. In some instances, the VCSEL 20 is not tilted. In one embodiment, the desired tilt angle is achieved, for example, by mixing polymer or silica beads of a known diameter with the conductive epoxy used to secure the VCSEL 20 onto the TO header 10.

Figure 3:
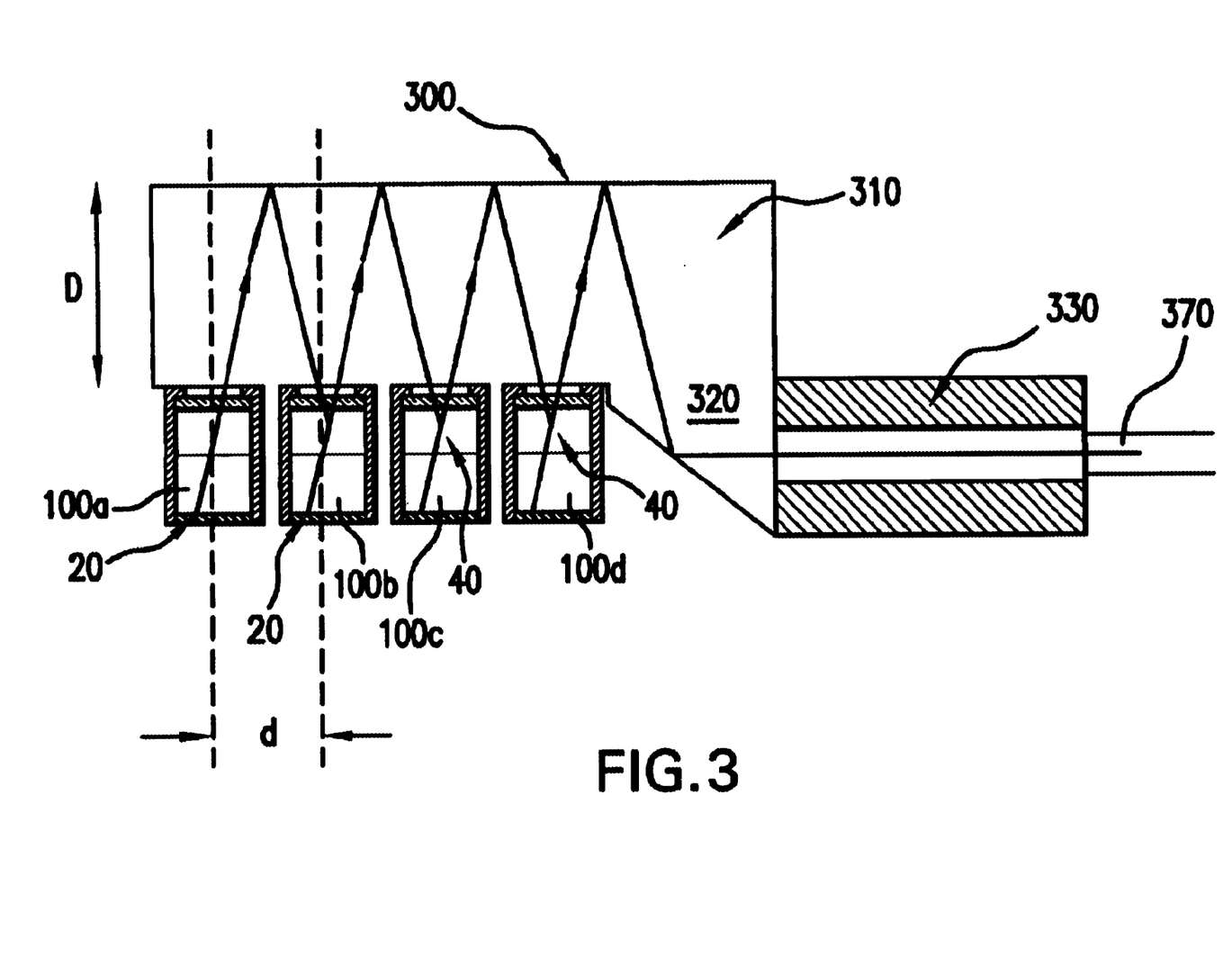
FIG. 3 shows a waveguide structure that multiplexes optical signals from several VCSEL sources integrated in transistor-outline (TO) cans according to an embodiment of the present invention.

The design of the TO cans as illustrated in FIG. 1 or similar design leads to embodiments of the present invention that direct to integrated zig-zag transmitter assemblies for multiplexing several wavelengths. FIG. 3 illustrates a cross-sectional view of an optical device for multiplexing optical signals from several VCSEL sources that are integrated in TO cans and for coupling the signals into an optical fiber according to an embodiment of the present invention. The multiplexing device comprises a number of TO cans 100a–100d, a waveguide structure 310, a prism 320 and a focusing element 330. The waveguide structure 310 may, for example, be made of glass or transparent plastic, and it can be considered as an optically transparent block according to an embodiment of the present invention. Conventional waveguides may also be implemented in other embodiments. The prism 320 may be attached or placed near the waveguide structure 310 in the arrangement as shown in FIG. 3. The prism 320 may be made of either glass or transparent plastic.

The TO cans 100a–100d have VCSELs 20 of different wavelengths mounted on or housed inside TO headers. The TO headers are fitted with TO header lids containing lenses and TFFs 40 to form the TO cans 100a–100d. In one embodiment, the TFFs 40 have passbands centered about corresponding VCSEL wavelengths, respectively, shifted by an amount appropriate for the angle of incidence. The TFFs 40 may be attached using standard index-matching optical epoxy. In the preferred implementation of this invention, the side of the waveguide structure 310 opposite the row of TO cans 100a–100d is coated with a broadband, highly reflective (HR) coating 300. The bandwidth of the HR coating 300 includes all the wavelengths to be multiplexed. In the embodiment, each of four TFFs 40 is highly reflective over the same bandwidth as the above-described HR coating surface 300 in the waveguide structure 310, except within a narrow passband centered at one of the four desired wavelengths. The passband of the TFFs 40 should be wide enough to allow for laser wavelength drift with temperature, manufacturing error, etc. The center wavelengths should be spaced sufficiently far apart, so that negligible overlap exists among the passbands of the TFFs 40.

The HR coating 300 has the function of directing each of the optical beams that emerges from each of the TO header lids back toward the aperture of its nearest neighbor. If d, the spacing between two TO cans, satisfies the relation $$d = 2\left(D\frac{\sin(\phi)}{\sqrt{1-\sin^2(\phi)}} + h\frac{\frac{n_1}{n_2}\sin(\phi)}{\sqrt{1-\left(\frac{n_1}{n_2}\right)^2\sin^2(\phi)}}\right) \quad (1)$$

where D is the thickness of the rectangular waveguide structure 310, h is distance between the top of the TO header lid and the TFF 40, and $\phi$ is the off-axis propagation angle, then the beam will enter the aperture of the neighboring lid, be reflected by the TFF mounted there, and re-enter the waveguide structure 310. The refraction indexes $n_1$ and $n_2$ are those of the waveguide structure 310 and the TO header optics, respectively.

The light from all the VCSELs 20 become multiplexed into a common beam as it propagates through the "zig-zag" waveguide structure 310. The multiplexed beam is directed at oblique incidence onto the prism 320, where it is reflected into the focusing element 310 and thereby coupled into an optical fiber 370. In one embodiment, the angle of incidence onto the face of the prism 320 is deliberately chosen so that it exceeds the critical angle for the air-glass or air-plastic interface, resulting in total internal reflection and minimal power loss. In another embodiment, an index-matched adhesive, or a single piece molded construction, is also utilized to further minimize loss at the prism-waveguide structure interface. In addition, the integration of a female connector (e.g. MT-RJ or LC) with the focusing lens into a single part places the fiber input with the desired precision near the lens' focal point, thereby optimizing coupling into the optical fiber 370.

Figure 4:
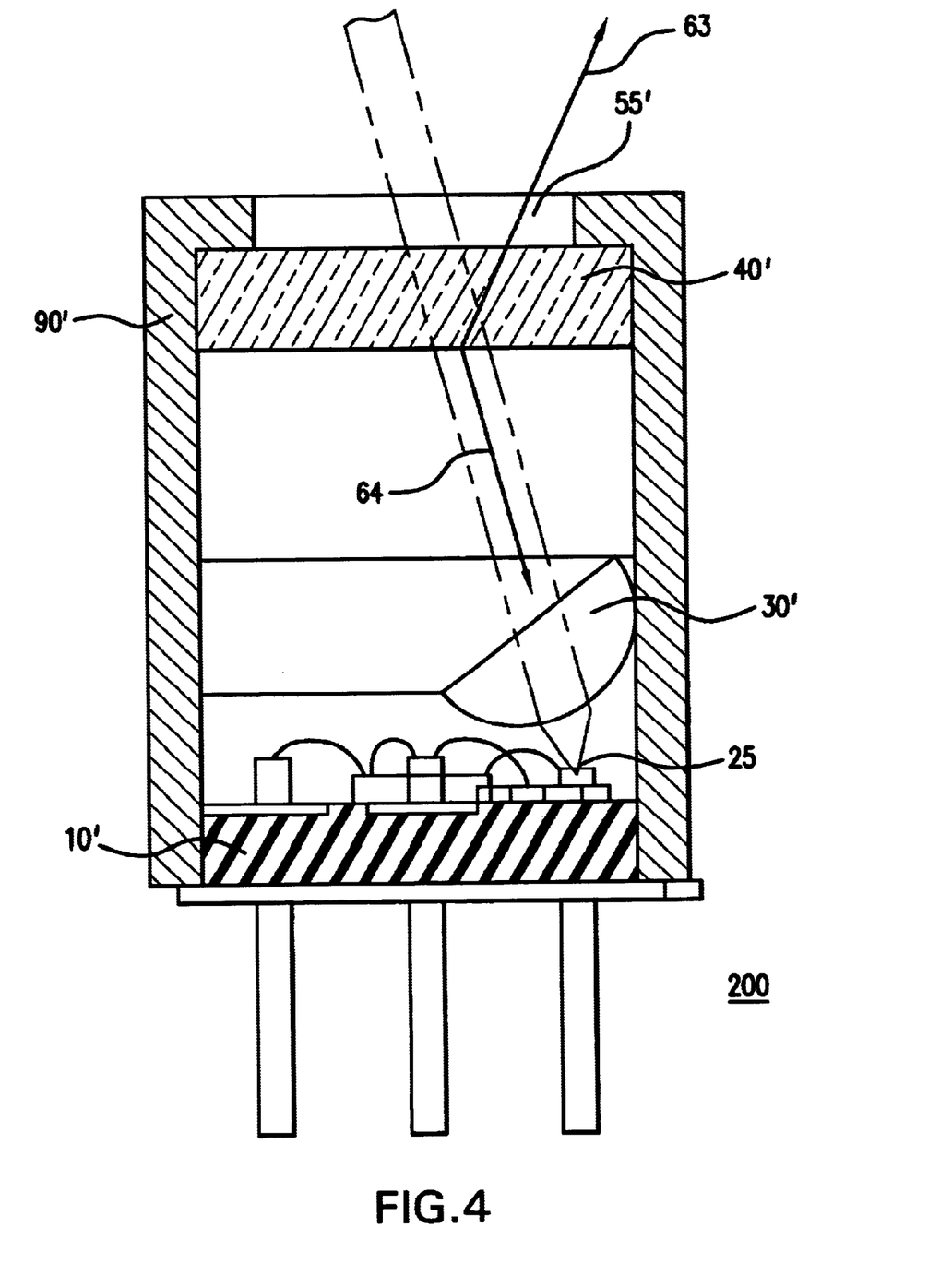
FIG. 4 shows an integration of a photodiode, transimpedance amplifier, lens, and thin-film-filter into a transistor-outline (TO) can according to an embodiment of the invention.

In a reverse process to that previously described for the multiplexing device in a transmission mode, embodiments of the present invention relate to integrated zig-zag receiver assemblies for demultiplexing several optical signals. FIG. 4 illustrates a cross-sectional view of a TO can with the integration of a photodiode, TIA, lens and TFF according to an embodiment of the present invention. The TO can 200 comprises a TO header 10', a TO header lid 90', a photodiode 25, a TIA (not shown), a lens 30', and a TFF 40'. The photodetector 25 may, for example, be a photodiode. The photodetector 25 and the TIA are integrated onto the TO header 10'. The lens 30' and TFF 40' are incorporated into the TO header lid 90', with the lens 30' being positioned between the photodetector 25 and the TFF 40'.

In one embodiment, the photodetector 25 is mounted off-axis and/or tilted slightly on the TO header 10', and the lens 30' is specifically designed to focus a beam 64 from the TFF 40' and direct the beam 64 off-axis onto the photodetector 25. The lens 30 may, for example, be an off-axis lens. Thus, when the TO header 10' is fitted with the TO header lid 90', which holds place the lens 30', the detection of off-axis collimated illumination is optimized. In addition, the TO header lid 90' may also contain a TFF 40' designed with a passband that ensures high transmittance at the specific wavelength and specific angle of incidence. In particular, the TFF 40' is designed to account for the shift in the center bandpass frequency associated with the off-axis illumination. In one embodiment, the TFF 40' may, for example, reside on a glass or a plastic window inside the TO header lid 90' and be positioned near or as close as possible to the aperture 55'. Shown in FIG. 4 are two exemplary rays 63, 64 with different wavelength components that may be separated from a light beam entering the aperture 55' and passing through the TFF 40'. The ray 64, which is inside the transmission band of the TFF 40', passes through the TFF 40' and is focused onto the photodetector 25. The ray 63, which is outside the transmission band of the TFF 40', is reflected back through the aperture 55'.

Figure 5:
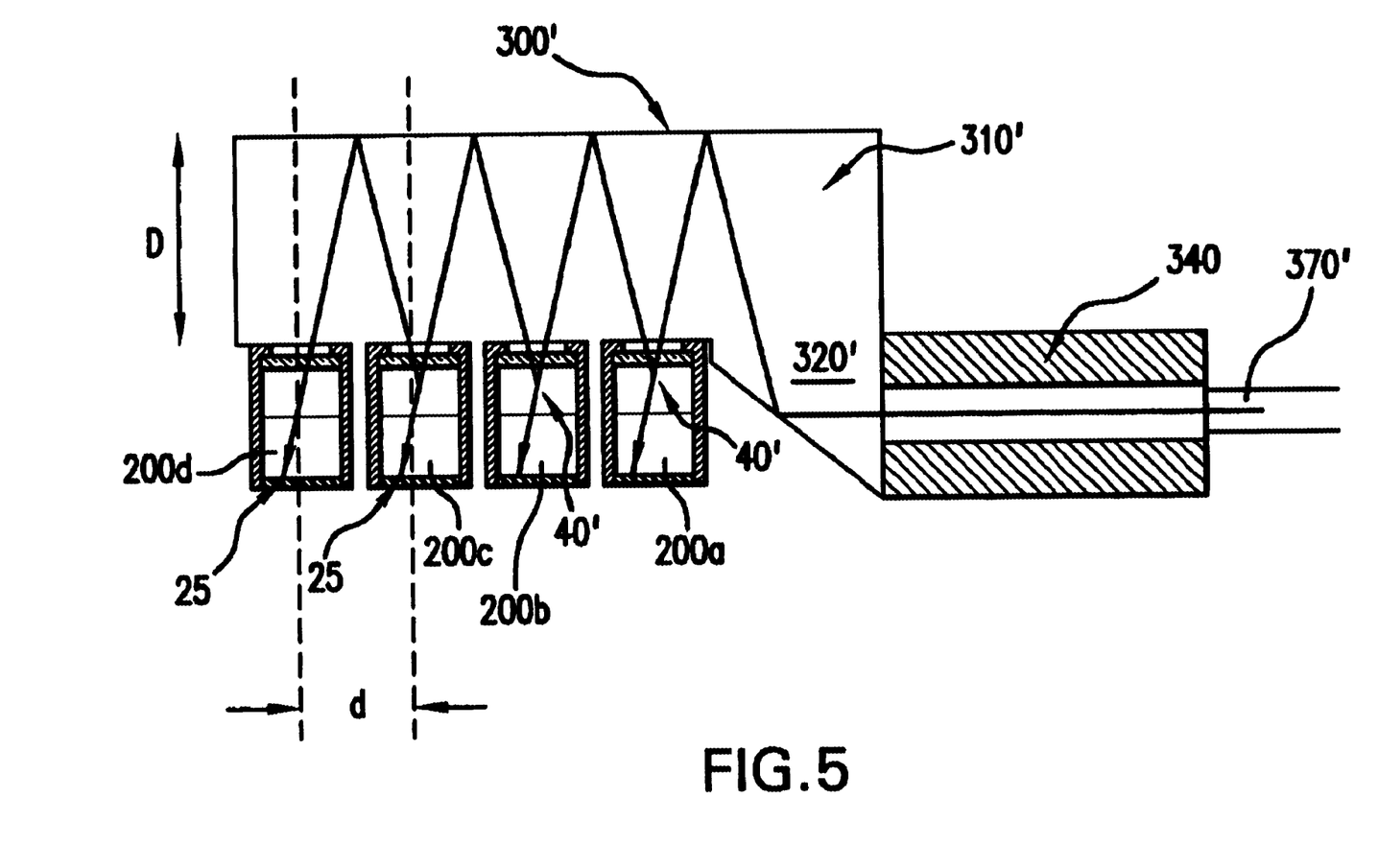
FIG. 5 shows a waveguide structure that demultiplexes several optical signals according to an embodiment of the present invention.

FIG. 5 illustrates a cross-sectional view of an optical device for demultiplexing several optical signals from an optical fiber according to an embodiment of the present invention. The demultiplexing device comprises a number of TO cans 200a–200d, a waveguide structure 310', a prism 320' and a collimating element 340. The waveguide structure 310' may, for example, be made of glass or transparent plastic, and it can be considered as an optically transparent block according to an embodiment of the present invention. Conventional waveguides may also be implemented in other embodiments. The prism 320' may be attached or placed near the waveguide structure 310' in the arrangement as shown in FIG. 5. The prism 320' may be made of either glass or transparent plastic.

The TO cans 200a–200d have detectors 25 and TIAs (not shown) mounted on or housed inside TO headers. The TO headers are fitted with TO header lids containing integrated optics, such as lenses and TFFs 40' to form the TO cans 200a–200d. In one embodiment, the TFFs 40' have passbands centered about corresponding transmission band wavelengths, respectively, shifted by an amount appropriate for the angle of incidence. The TFFs 40' may be attached using standard index-matching optical epoxy. In the preferred implementation of this invention, the side of the waveguide structure 310' opposite the row of TO cans 200a–200d is coated with a broadband, highly reflective (HR) coating 300'. The bandwidth of the HR coating 300' includes all the wavelengths to be demultiplexed. In the embodiment, each of four TFFs 40' is highly reflective over the same bandwidth as the above-described HR coating surface 300' of the waveguide structure 310', except within a narrow passband centered at one of the four wavelengths of the input beam. The passband of the TFFs 40 should be wide enough to allow for laser wavelength drift with temperature, manufacturing error, etc. The center wavelengths should be spaced sufficiently far apart, so that negligible overlap exists among the passbands of the TFFs 40. The HR coating 300' has the function of directing the optical beam from the optical fiber 370' into the TO cans 200a–200d, as well as directing each of the optical beams that emerges from each of the TO header lids back toward the aperture of its nearest neighbor to the left in FIG. 5.

In operation, light from the optical fiber 370' is collimated by a collimating element 340, such as a lens and/or other optical components. In one embodiment, the collimated light beam is directed normal to the face of the prism 320' inside the demultiplexing device or receiver module. An angled surface of the prism 320' directs the reflected beam at a specific angle into the rectangular waveguide structure 310'. The prism angle is designed to ensure total internal reflection at this interface. After reflecting from the HR coated backside 300' of the waveguide structure 310', the collimated beam enters the TO header lid of the first TO can 200*a*. The spectral energy outside the transmission bandwidth of the TFF of the TO can 200*a* is reflected, while any light within the passband of the TFF continues into the TO can 200*a*. The latter is focused by the off-axis lens (not shown) onto an off-axis or non-off-axis detector 25. On the other hand, the reflected light exits through the aperture of the TO can 200*a* and encounters the HR coating 300'. The HR coating 300' redirects the reflected light, allowing it to enter the TO header lid of the second TO can 200*b*. The processes then repeat until the light reaches the last TO can 200*d*. With this arrangement, each transmitted wavelength is detected by its corresponding detector 25 as the beam propagates along the "zig-zag" waveguide structure 310'.

Figure 6:
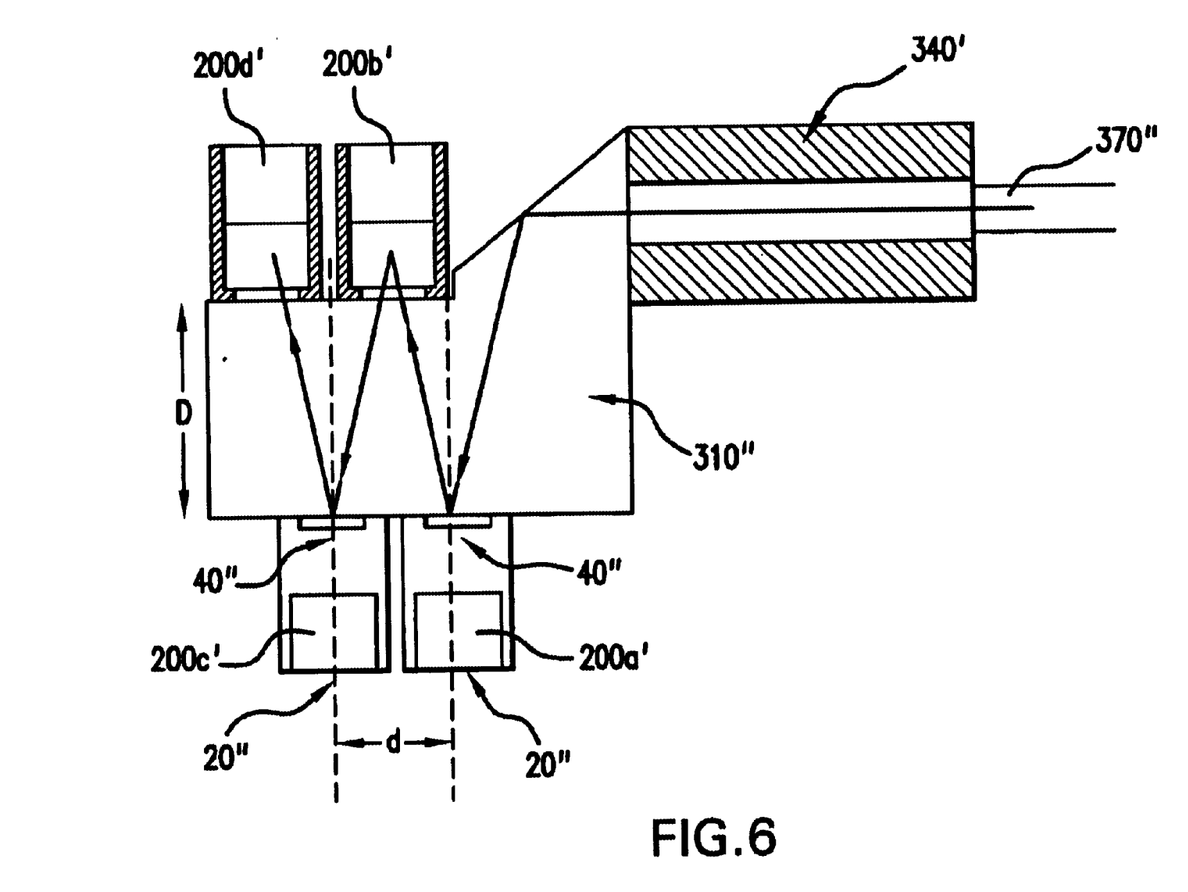
FIG. 6 illustrates an alternative implementation of a four-channel CWDM receiver according to an embodiment of the present invention.

Several alternative implementations of the present invention are possible, with relatively minor changes to the basic structure. FIG. 6, for example, illustrates an alternative way of implementing a four-channel CWDM receiver according to an embodiment of the present invention. Here, the TO cans 200*a'*–200*d'* are arranged in such a manner that the total waveguide travel distance is divided in half. With the removal of the reflective coating, half of the TO headers are placed on the opposite side of the waveguide structure 310". The TO cans 200*a'*–200*d'* are basically aligned along two parallel spaced-apart axes in an alternate manner, one axis being above the waveguide structure 310" and the other axis being below the waveguide structure 310". In another embodiment, a transmitter or a multiplexing device may also be fabricated using the same arrangement of a waveguide structure, prism, focusing element and TO cans populated with VCSELs or other types of light sources.

Another embodiment of the present invention is directed to a transceiver module, preferably a CWDM module. The transceiver module comprises a multiplexing device as a transmitter and a demultiplexing device as a receiver. The transceiver module may further comprise any one of alignment ferrules for optical fibers, a fiber connector housing, and a ledge to precisely control the planar orientation of a printed circuit board. Using a combination of TO cans, VCSELs, photodetectors, TIAs, lenses and TFFs, prisms, a focusing element and a collimating element, the transceiver is able to collimate and route light from two or more VCSELs or edge-emitting lasers through a "zig-zag" configuration as well as to redirect and focus the combined light onto the core of a single optical fiber. Moreover, collimating and routing light with multiple wavelength components from a single optical fiber through a free-space "zig-zag" configuration and redirecting and focusing the light at each individual wavelength onto a different photodetector are achieved.

Figures 7A, 7B:
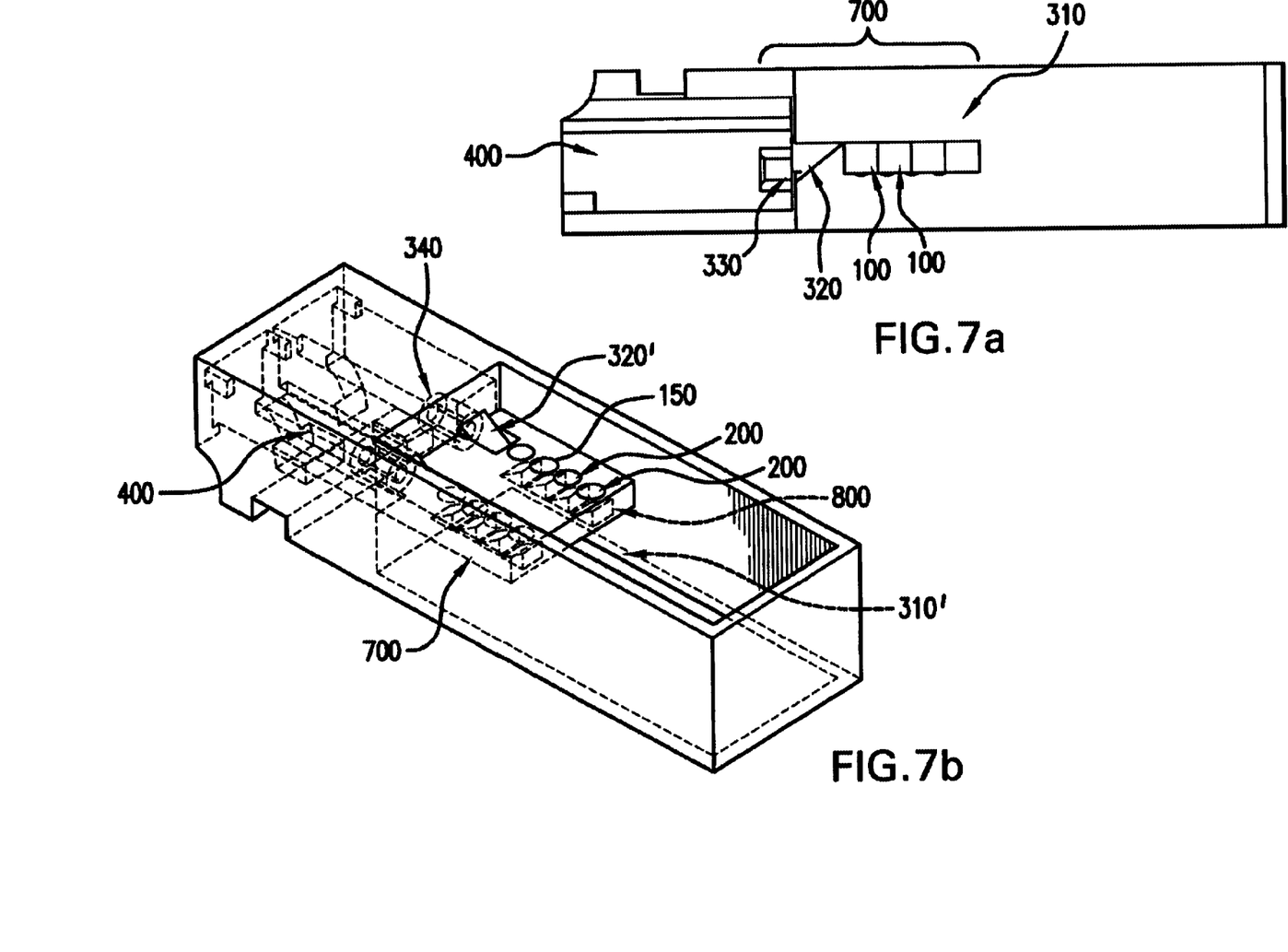
FIGS. 7a and 7b show a four channel CWDM transceiver module integrated with a connector housing suitable to receive a fiber optic connector according to an embodiment of the present invention.

FIGS. 7*a* and 7*b* show perspective views of a four-wavelength CWDM transceiver module integrated with a housing suitable for receiving a duplex fiber optic connector according to an embodiment of the present invention. FIG. 7*a* is a cross-sectional view of the four-wavelength CWDM transceiver module that shows the cross-sectional view of a multiplexing device 700 within a housing. In one embodiment, the multiplexing device comprises a number of TO cans 100, a waveguide structure 310, a prism 320 and a focusing element 330. The multiplexing device is integrated with a connector housing 400 suitable to receive a duplex fiber connector or any other fiber optic connector. Each TO can 100 includes a TO header integrated with a VCSEL, or other light source, as well as a TO header lid incorporated with a lens and a TFF. For clarity sack, these components were not shown in FIG. 7*a*. Light beams from VCSELs in the TO cans 100 travel through the lens and the TFFs having different passbands. In one embodiment, the VCSELs are positioned off-axis on its corresponding TO headers and the lenses in the corresponding TO header lids are off-axis lenses, allowing generation of off-axis collimated illumination from the corresponding TO cans 100. The waveguide structure 310 receives these light beams with different wavelength components from the TO cans 100, and the light beams propagate through the waveguide structure 310 in a zig-zag fashion. A prism interface utilizes total internal reflection to redirect light from the waveguide structure 310 to the focusing element 330. The focusing element 330 couples all the different wavelength components into an optical fiber (not shown).

FIG. 7*b* is a perspective view of the four-wavelength CWDM transceiver module with the housing looking from the bottom of the transceiver module. This view shows both the multiplexing device 700 and a demultiplexing device 800. The two devices 700, 800, being parallel to each other, are integrated with the connector housing 400 suitable to receive a duplex fiber connector or any other fiber optic connector. In one embodiment, the demultiplexing device 800 comprises a collimating element 340, a waveguide structure 310', a prism 320' and a number of TO cans 200. The collimating element 340 collimates a light beam having different wavelength components from an optical source input (not shown), creating a collimated light beam. A prism interface utilizes total internal reflection to redirect light from the optical source input to the waveguide structure 310'. The waveguide structure 310' receives the redirected collimated light beam with different wavelength components. Each TO can 200 includes a TO header integrated with a photodetector and a TIA, as well as a TO header lid incorporated with a lens and a TFF. For clarity sack, these components were not shown in FIG. 7*b*. As the collimated light beam propagates within the waveguide structure 310' in a zig-zag fashion, the different wavelength components of the collimated light beam are separated from each other by the TO cans 200 having TFFs with matching passband wavelengths. The individual wavelength component is focused by the lens below the corresponding TFF, and detected by the corresponding photodetector below the lens in the TO cans 200. In one embodiment, the photodetectors are positioned off-axis on its corresponding TO headers and the lenses in the corresponding TO header lids are off-axis lenses, allowing the optimization of the detection of off-axis collimated illumination in the corresponding TO cans 200. Further shown in FIG. 7*b* are slots 150 used for accurately placing TO cans 200 in the demultiplexing device. Although these slots are shown to retain a circular shape, other shapes may be utilized according to specific applications.

Figure 8:
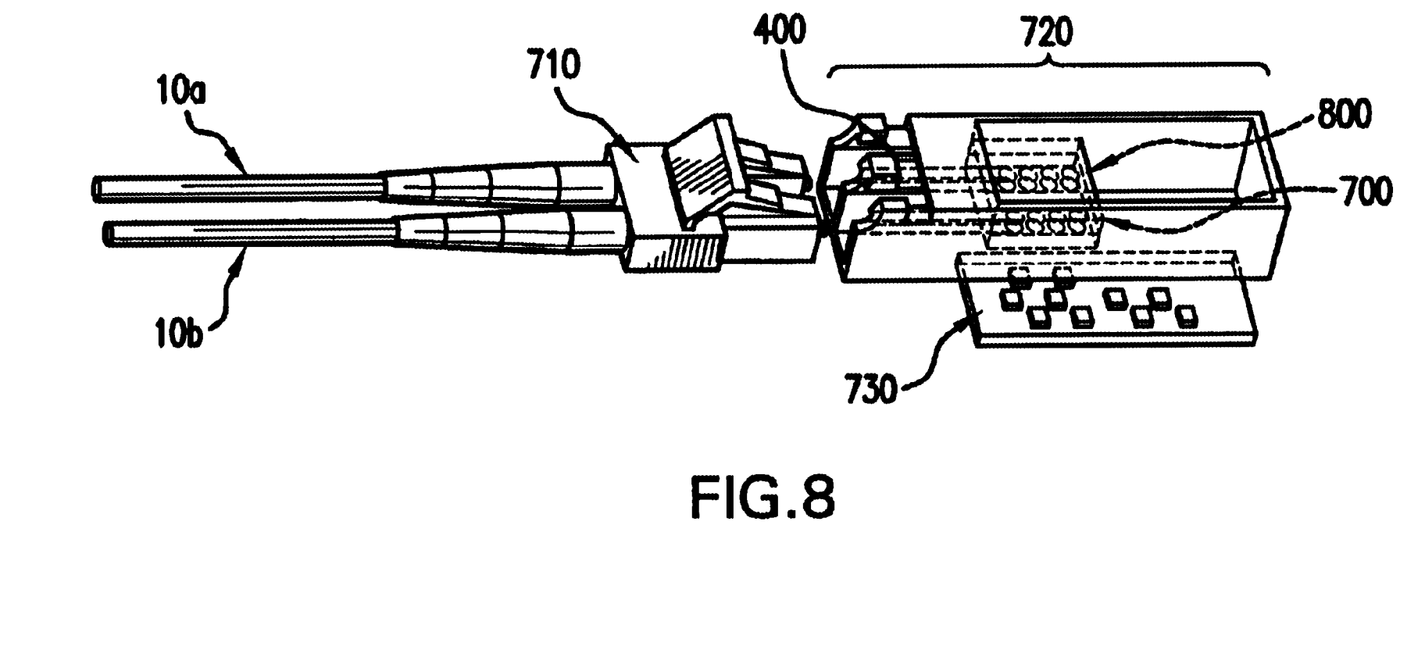
FIG. 8 shows a complete transceiver module in which embodiments of the present invention may function.

FIG. 8 shows a complete transceiver module according to an embodiment of the present invention. The complete transceiver module includes a dual fiber optic connector 710, an injection-molded optical assembly 720, a printed circuit board (PCB) 730, and a metal shield for minimizing electromagnetic interference (not shown). Optical fibers 10*a*, 10*b* are connected to the dual fiber connector 710. One optical fiber in the dual connector 710 is for the receiver, and the other one is for the transmitter. The dual fiber connector 710 slides into the connector housing 400. The PCB 730 is aligned with the multiplexing device 700 and/or the demultiplexing device 800. On the PCB 730, there may be laser sources, photodetectors, chips and other circuitry for processing electrical signals.

Embodiments of the present invention are further directed to deliberate ordering of transmitted and received optical channels in a CWDM module so as to optically equalize the RF signal strength. Because VCSEL collimation is seldom ideal, for example, divergence in the beam may result in greater optical loss for channels more distant from the focusing lens in the transmitter. This potentially could result in lower electrical signals at the receiver. This can be compensated for, in all or in part, by placing the detector associated with the most distant VCSEL nearest the collimator in the receiver. This is effective because optical losses in the receiver, due to reflectance losses and beam divergence, also penalize the most distant channels. This has the effect of equalizing the signal levels in the different channels.

An alternative technique for equalizing the signal levels in the channels, which may or may not be used in conjunction with the method described above, is to employ monotonically increasing gain in the trans-impedance or limiting amplifiers in the receiver according to an embodiment of the present invention. In the embodiment, the use of channel-dependent amplifier gain in the receiver compensates for channel-dependent optical loss in the transmitter.

Embodiments of the present invention are also directed to the designs of a fiber-optic collimator that balances the specific divergence angle due to the core size of an optical fiber against the focusing angle of a lens to optimize a beam waist over the full image distance. Because of the large core diameter (a) of a typical multimode fiber, beam divergence (DA) from a collimator with the fiber tip at the lens focal point leads to an increasing beam waist as light travels through the "zig-zag" waveguide structure. In the preferred embodiment, a collimation technique that compensates beam divergence with a slight beam focusing is utilized. The divergence angle is often expressed, in radians, by $$DA(r) = a(mm)/f(mm) \quad (2)$$

where f is the collimator focal length. If the fiber tip is pulled back from the focal point the divergence becomes $$DA(r) = a(mm)/o(mm) \quad (3)$$

where o is the object distance. The focus angle (FA) may be defined by $$FA(r) = BR(mm)/i(mm) \quad (4)$$

where BR denotes the beam radius after collimation and i denotes the image distance. The beam radius is related to the numerical aperture (NA) of the fiber by the relation $$BR(mm) = o(mm)NA \quad (5)$$

Setting the two angles equal, assuming $$\frac{a(mm)}{f(mm)NA} \ll 1,$$

and using the relation $$i = \frac{fo}{(o-f)}, \quad (6)$$

gives $$o(mm) = f(mm) + \frac{a(mm)}{2NA} \quad (7)$$

By pulling the fiber tip back from the lens focal point, the focus angle compensates the divergence angle, keeping the beam waist constant up to the image distance, a position that may be estimated by inserting Equation (7) into Equation (5).

$$i(mm) \cong \frac{2f(mm)^2 NA}{a(mm)} \quad (8)$$

As long as the distance in Equation (7) is greater than the total travel distance between the collimating lens and the final detector in FIG. 5, the technique is effective. Making these two distances equal establishes a criterion for the minimum focal length (and therefore minimum beam radius) allowed in the system for a given fiber NA and core diameter. Equations (2) and (3) which lead to Equation (6) assume that the angles involved satisfy sin(FA)=FA and sin(DA)=DA. Greater accuracy in the approximation may be obtained with a more rigorous calculation in the same spirit, without making the approximation $$\frac{a(mm)}{f(mm)NA} \ll 1.$$

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transistor outline (TO) can, comprising:
   a TO header;
   a TO header lid covering the TO header;
   a vertical cavity surface emitting laser (VCSEL) integrated onto the TO header;
   a lens incorporated into the TO header lid; and
   a thin-film filter (TFF) incorporated into the TO header lid, wherein the lens is positioned between the VCSEL and the TFF.

2. The TO can of claim 1, wherein the VCSEL is positioned off-axis on the TO header and the lens in the TO header lid is an off-axis lens, allowing generation of off-axis collimated illumination.

3. The TO can of claim 2, wherein the TFF in the TO header lid is designed to account for a shift in a center bandpass frequency associated with the off-axis illumination.

4. The TO can of claim 1, wherein the lens in the TO header lid is an off-axis lens, and the VCSEL on the TO header is tilted to maximize collimated power from the off-axis lens.

5. The TO can of claim 4, wherein the TFF in the TO header lid is designed to account for a shift in a center bandpass frequency associated with the off-axis illumination.

6. A transistor outline (TO) can, comprising:
   a TO header;
   a TO header lid covering the TO header;
   a photodetector integrated onto the TO header;
   a transimpedance amplifier integrated onto the TO header;

a lens incorporated into the TO header lid; and a thin-film filter (TFF) incorporated into the TO header lid, wherein the lens is positioned between the photodetector and the TFF.

7. The TO can of claim 6, wherein the photodetector is positioned off-axis on the TO header and the lens in the TO header lid is an off-axis lens, allowing optimization of detection of off-axis collimated illumination.

8. The TO can of claim 7, wherein the TFF in the TO header lid is designed to account for a shift in a center bandpass frequency associated with the off-axis illumination.

9. An optical multiplexing device of a zig-zag design, comprising:

a plurality of transistor-outline (TO) cans, each of the TO cans including a TO header integrated with a vertical cavity surface emitting laser (VCSEL), and a TO header lid incorporated with a lens and a thin-film filter (TFF);

a waveguide structure that receives light beams, each with a different wavelength component, from the TO cans; and a focusing element that couples a light beam with different wavelength components from the waveguide structure into an optical fiber, wherein light beams from VCSELs in the TO cans travel through the lens, the TFFs with different passband wavelengths, the waveguide structure, and the focusing element into the optical fiber.

10. The optical multiplexing device of claim 9, wherein at least one of the VCSELs is positioned off-axis on its corresponding TO header and the lens in the corresponding TO header lid is an off-axis lens, allowing generation of off-axis collimated illumination from a corresponding TO can.

11. The optical multiplexing device of claim 10, wherein the TFF in the corresponding TO header lid is designed to account for a shift in a center bandpass frequency associated with the off-axis illumination from the corresponding TO can.

12. The optical multiplexing device of claim 9, further including a prism interface that utilizes total internal reflection to redirect light from the waveguide structure to the focusing element.

13. The optical multiplexing device of claim 9, wherein the waveguide structure has a top side coated to act as a reflective mirror.

14. An optical demultiplexing device of a zig-zag design, comprising:

a collimating element that collimates a light beam having different wavelength components from an optical source input, creating a collimated light beam;

a waveguide structure that receives the light beam from the collimating element; and a plurality of transistor-outline (TO) cans, each TO can comprising a TO header integrated with a photodetector, a transimpedance amplifier, and a TO header lid incorporated with a lens and a thin-film filter (TFF), wherein the collimated light beam travels in a zig-zag fashion within the waveguide structure, the different wavelength components of the collimated light beam being separated from each other by the TO cans having TFFs with matching passband wavelengths, focused by lenses below the TFFs, and detected by photodetectors below the lenses.

15. The optical demultiplexing device of claim 14, wherein at least one of the photodetectors is positioned off-axis on its corresponding TO header, and the lens in the corresponding TO header lid is an off-axis lens, allowing optimization of detection of off-axis collimated illumination in a corresponding TO can.

16. The optical demultiplexing device of claim 15, wherein the TFF in the corresponding TO header lid is designed to account for a shift in a center bandpass frequency associated with the off-axis illumination.

17. The optical demultiplexing device of claim 14, wherein the TO cans are aligned along two parallel spaced-apart axes in an alternate manner.

18. The optical demultiplexing device of claim 14, further including a prism interface that utilizes total internal reflection to redirect light from the collimating element to the waveguide structure.

19. The optical demultiplexing device of claim 14, wherein the TO cans are aligned along an axis, and the waveguide structure has a side coated to act as a reflective mirror.

20. The optical demultiplexing device of claim 14, wherein the collimating element balances specific divergence angle due to core size of the optical source input against focusing angle of a lens to optimize beam waist of the light beam over a full image distance.

21. A method of providing a transistor outline (TO) can, comprising:

providing a TO header;

providing a TO header lid to cover the TO header;

integrating a vertical cavity surface emitting laser (VCSEL) onto the TO header;

incorporating a lens into the TO header lid; and incorporating a thin-film filter (TFF) into the TO header lid, wherein the lens is positioned between the VCSEL and the TFF.

22. The method of claim 21, further comprising:

positioning the VCSEL off-axis on the TO header; and positioning the lens in the TO header lid off-axis, wherein generation of off-axis collimated illumination is allowed.

23. The method of claim 22, wherein the TFF in the TO header lid is designed to account for a shift in a center bandpass frequency associated with the off-axis illumination.

24. A method of providing a transistor outline (TO) can, comprising:

providing a TO header;

providing a TO header lid to cover the TO header;

integrating a photodetector onto the TO header;

integrating a transimpedence amplifier onto the TO header;

incorporating a lens into the TO header lid; and incorporating a thin-film filter (TFF) into the TO header lid, wherein the lens is positioned between the photodetector and the TFF.

25. The method of claim 24, further comprising:

positioning the photodetector off-axis on the TO header; and positioning the lens in the TO header lid off-axis, wherein optimization of detection of off-axis collimated illumination is allowed.

26. The method of claim 25, wherein the TFF in the TO header lid is designed to account for a shift in a center bandpass frequency associated with the off-axis illumination.

* * * * *